(12) United States Patent
Hara et al.

(10) Patent No.: US 7,635,111 B2
(45) Date of Patent: Dec. 22, 2009

(54) SUCTION CUP DEVICE

(75) Inventors: Fumio Hara, Saitama (JP); Takayuki Akai, Chiba (JP)

(73) Assignee: Sony Corporation, Tokyo (JP)

( * ) Notice: Subject to any disclaimer, the term of this patent is extended or adjusted under 35 U.S.C. 154(b) by 256 days.

(21) Appl. No.: 11/865,450

(22) Filed: Oct. 1, 2007

(65) Prior Publication Data

US 2008/0251664 A1  Oct. 16, 2008

(30) Foreign Application Priority Data

Nov. 10, 2006  (JP) ............... 2006-305024

(51) Int. Cl.
*A47G 1/17* (2006.01)
*A47G 29/00* (2006.01)
*F16B 47/00* (2006.01)
*A45D 42/14* (2006.01)

(52) U.S. Cl. ............. 248/205.8; 248/205.5; 248/205.6; 248/205.7; 248/206.1; 248/206.2; 248/363

(58) Field of Classification Search ............. 248/205.5, 248/205.6, 205.7, 205.8, 206.1, 206.2, 363
See application file for complete search history.

(56) References Cited

U.S. PATENT DOCUMENTS

| | | | | |
|---|---|---|---|---|
| 1,847,403 A * | 3/1932 | Loughman | ............ | 40/597 |
| 2,557,434 A * | 6/1951 | Hoverder | ............ | 248/544 |
| 5,411,230 A * | 5/1995 | Messinger | ............ | 248/205.8 |
| 6,143,391 A * | 11/2000 | Barnes et al. | ............ | 428/99 |
| 6,478,271 B1 * | 11/2002 | Mulholland | ............ | 248/205.8 |
| 6,669,033 B1 * | 12/2003 | Lian | ............ | 211/87.01 |
| 6,729,591 B2 * | 5/2004 | Hsu | ............ | 248/205.6 |
| 6,932,306 B2 * | 8/2005 | Zou et al. | ............ | 248/205.5 |
| 6,942,188 B2 * | 9/2005 | Tsay et al. | ............ | 248/205.8 |
| 6,966,530 B2 * | 11/2005 | Hsu | ............ | 248/206.2 |
| 7,226,026 B2 * | 6/2007 | Lin | ............ | 248/205.5 |
| 7,387,284 B2 * | 6/2008 | Chang | ............ | 248/206.5 |
| 7,431,250 B2 * | 10/2008 | Chen | ............ | 248/205.5 |
| 2002/0113181 A1 * | 8/2002 | Zou | ............ | 248/205.5 |
| 2004/0079848 A1 * | 4/2004 | Wu et al. | ............ | 248/205.5 |
| 2007/0210225 A1 * | 9/2007 | Carnevali | ............ | 248/205.8 |

FOREIGN PATENT DOCUMENTS

| | | |
|---|---|---|
| JP | 4-133773 | 12/1992 |
| JP | 5-60374 | 8/1993 |
| JP | 6-507963 | 9/1994 |
| JP | 8-128434 | 5/1996 |

* cited by examiner

*Primary Examiner*—J. Allen Shriver, II
*Assistant Examiner*—Michael McDuffie
(74) *Attorney, Agent, or Firm*—Oblon, Spivak, McClelland, Maier & Neustadt, L.L.P.

(57) ABSTRACT

A suction cup device, includes: a suction cup; a center shaft; an attaching base; a rock lever; a coil spring; and a cam mechanism.

11 Claims, 9 Drawing Sheets

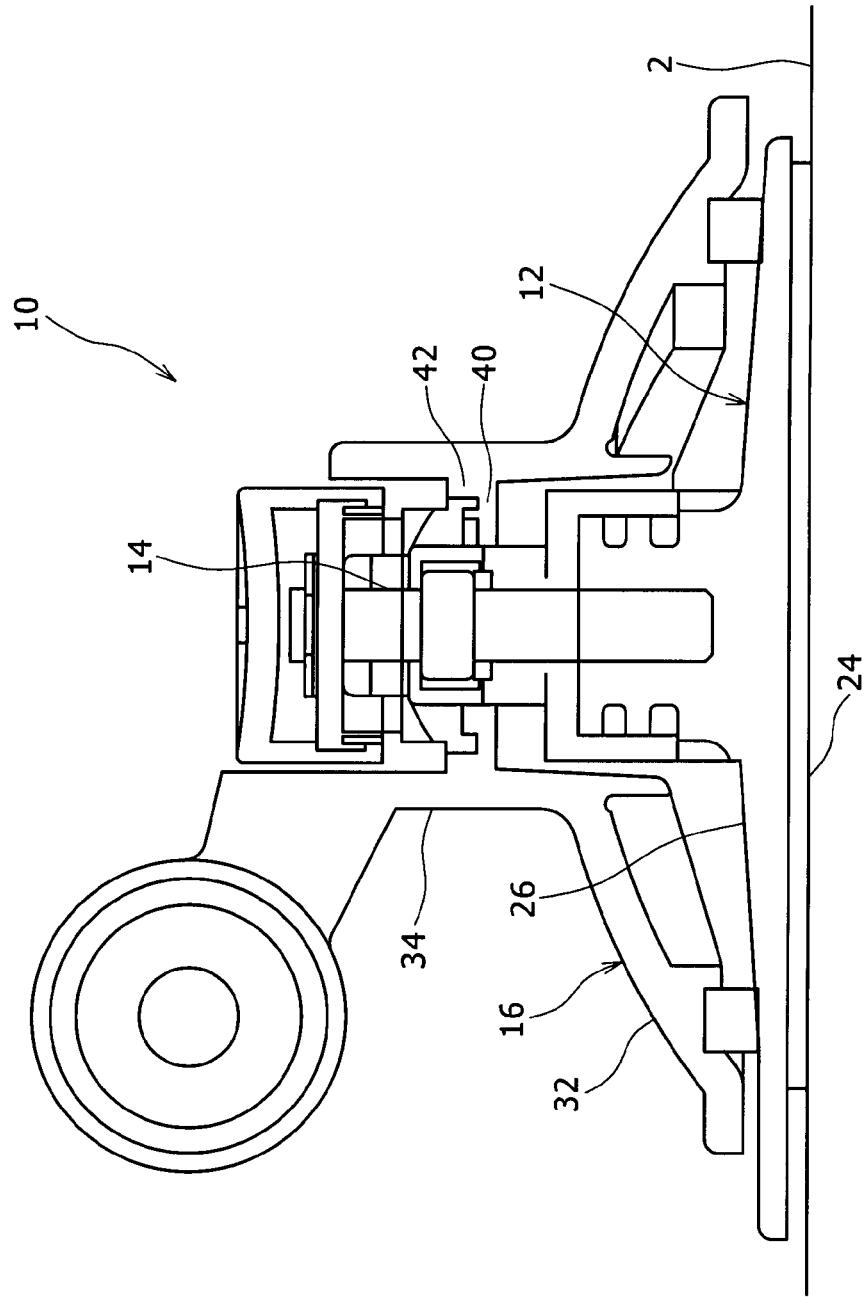

SUCTION CUP DEVICE

CROSS REFERENCES TO RELATED APPLICATIONS

The present invention contains subject matter related to Japanese Patent Application JP 2006-305024, filed in the Japan Patent Office on Nov. 10, 2006, the entire contents of which being incorporated herein by reference.

BACKGROUND OF THE INVENTION

1. Field of the Invention

This invention relates to a suction cup device.

2. Description of the Related Art

A suction cup device is used to attach various articles to an attaching object face.

Most of suction cup devices of the type described include a suction cup, a center shaft provided in a projecting manner from a rear face of the suction cup, a skirt member for covering the rear face of the suction cup, and an attaching base projecting from the center of the skirt member and having an outer tubular portion in which the center shaft is accommodated.

In order to stabilize an attached state of the suction cup device to the attaching object face, the suction face of the suction cup is opposed to the attaching object face to press the center shaft against the attaching object face such that the suction face is contacted over an overall face thereof with the attaching object face. Further, a rock lever is provided which displaces, in an initially attached state wherein an end of the skirt member contacts with an outer circumferential portion of the rear face of the suction cup, the center shaft in a direction away from the attaching object face to establish a finally attached state wherein the central portion of the suction face is spaced away from the attaching object face.

A suction cup device of the type described is disclosed, for example, in Japanese Utility Model Laid-Open No. Hei 4-133773.

SUMMARY OF THE INVENTION

However, in the existing suction cup device described above, since the rock lever rocks in a plane passing the center shaft, or in other words, since the rock lever rocks in a thicknesswise direction of the suction cup, it is necessary to assure a great space for the rocking motion of the rock lever. This is disadvantageous where it is tried to install a suction cup device at a narrow place.

Therefore, it is demanded to provide a suction cup device which eliminates the necessity to assure a large space for rocking motion of a rock lever and is advantageous in installation at a narrow plate.

According to an embodiment of the present invention, there is provided a suction cup device. The device includes a suction cup having a suction face and a rear face along a thicknesswise direction thereof, a center shaft provided at the center of the rear face of the suction cup and extending in a direction away from the rear face along the thicknesswise direction, and an attaching base having a skirt portion configured to cover the rear face of the suction cup and an outer tubular portion projecting from the center of the skirt portion and having the center shaft accommodated therein. The device further includes a rock lever coupled to an end portion of the center shaft against movement in an axial direction of the center shaft but for rotation in a circumferential direction of the center shaft between an initial position and a rocked position, and a coil spring disposed around the center shaft on the inner side of the outer tubular portion and anchored at one end thereof by the outer tubular portion and at the other end thereof by the rock lever in such a manner as to bias the rock lever toward the initial position and bias the outer tubular portion and the rock lever in a direction away from each other along the center shaft. The device still further includes a cam mechanism provided between the outer tubular portion and the rock lever and configured to move, in response to the rotation of the rock lever from the initial position to the rocked position, the suction cup from an initially attached state which is established by pressing, with the suction face opposed to an attaching object face, the center shaft against the attaching object face until the suction face is contacted over an overall area thereof with the attaching object face and an end portion of the skirt portion is contacted with an outer circumferential portion of the rear face or with a portion of the attaching object face on the outer side in a radial direction of the rear face to a finally attached state wherein the center shaft is displaced in a direction away from the attaching object face and then retain the rock lever at the rocked position against the biasing force of the coil spring.

According to another embodiment of the present invention, there is provided a suction cup device. The device includes a suction cup having a suction face and a rear face along a thicknesswise direction thereof, a center shaft provided at the center of the rear face of the suction cup and extending in a direction away from the rear face along the thicknesswise direction, and an attaching base having a skirt portion configured to cover the rear face of the suction cup and an outer tubular portion projecting from the center of the skirt portion and having the center shaft accommodated therein. The device further includes a rock lever coupled to an upper portion of the center shaft against movement in an axial direction of the center shaft but for rotation in a circumferential direction of the center shaft between an initial position and a rocked position, and a coil spring disposed around the center shaft on the inner side of the outer tubular portion and anchored at one end thereof by the outer tubular portion and at the other end thereof by the rock lever in such a manner as to bias the rock lever toward the initial position and bias the outer tubular portion and the rock lever in a direction away from each other along the center shaft. The suction cup has an intermediately attached state in which the center shaft is displaced in a direction away from an attaching object face from a position thereof in an initially attached state of the suction cup device in which the suction face contacts over an overall area thereof with the attaching object face with the suction face opposed to the attaching object face and with the center shaft pressed against the attaching object face and a lower end of the skirt portion is contacted with an outer circumferential portion of the rear face or with a portion of the attaching object face on the outer side of the rear face in a radial direction being formed by the coil spring. The suction cup device has a cam mechanism configured to move, in response to rotation of the rock lever from the initial position to the rocked position, the suction cup from the position in the intermediately attached state to another position in a finally attached state in which the center shaft is displaced further in the direction away from the attaching object face and then retain the rock lever at the rocked position against the biasing force of the coil spring.

With the suction cup devices, the finally attached state of the suction cup device can be established by rotating the rock lever around the center shaft. Consequently, the suction cup devices can be attached to a small space advantageously.

The features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a sectional view of the suction cup device in a finally attached state;

DETAILED DESCRIPTION OF THE PREFERRED EMBODIMENT

Figure 1:
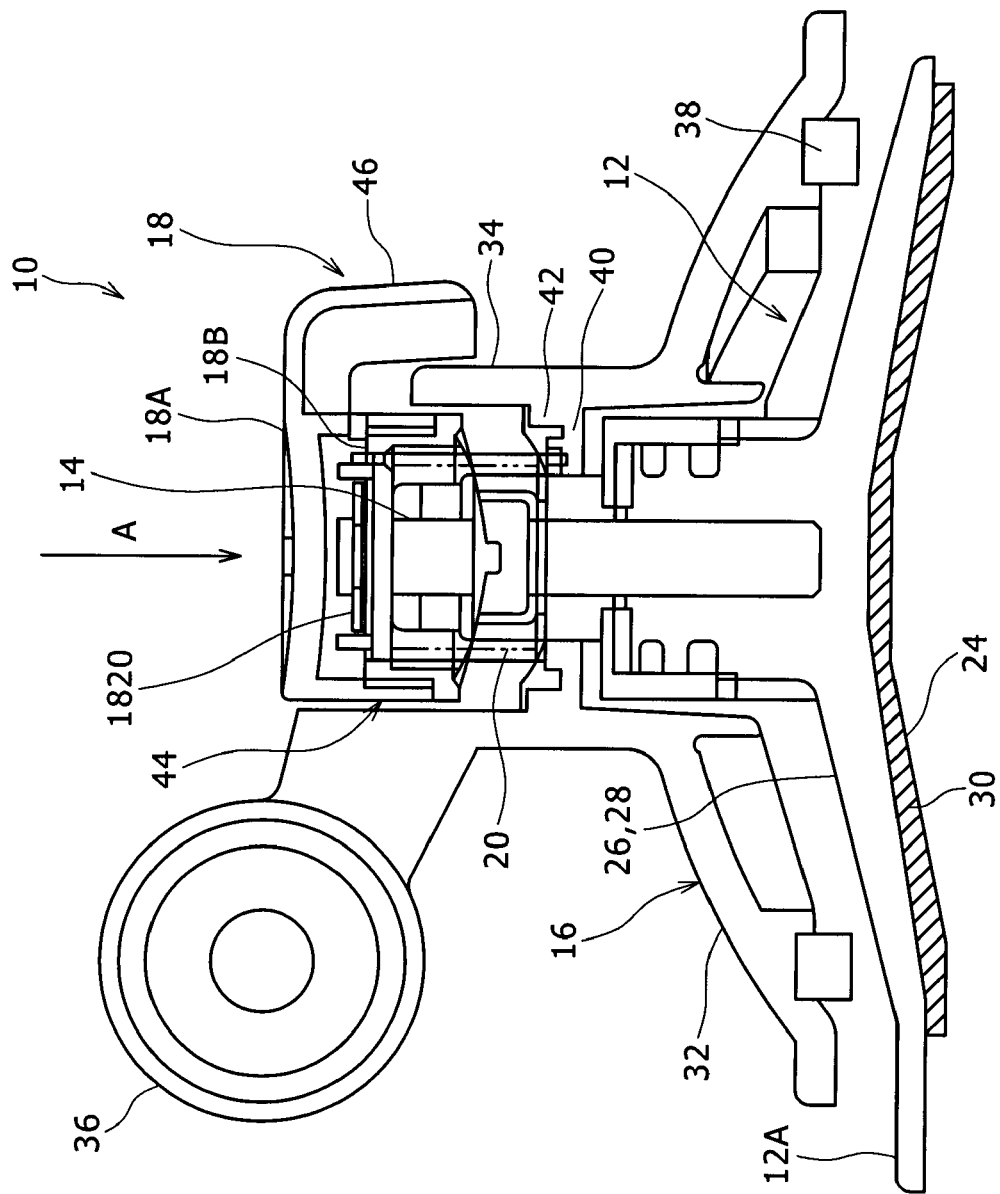
FIG. 1 is a sectional view showing a suction cup device to which the present invention is applied and which is in a non-attached state.

Referring first to FIG. 1, there is shown a suction cup device 10 to which the present invention is applied. The suction cup device 10 is used to support a display panel of a car navigation system or a television apparatus on the dashboard in the cabin of an automobile or support a controller for remotely controlling various vehicle-carried apparatus or a like apparatus.

As shown in FIG. 1, the suction cup device 10 includes a suction cup 12, a center shaft 14, an attaching base 16, a rock lever 18, a coil spring 20, a cam mechanism 22 and so forth.

Figure 6:
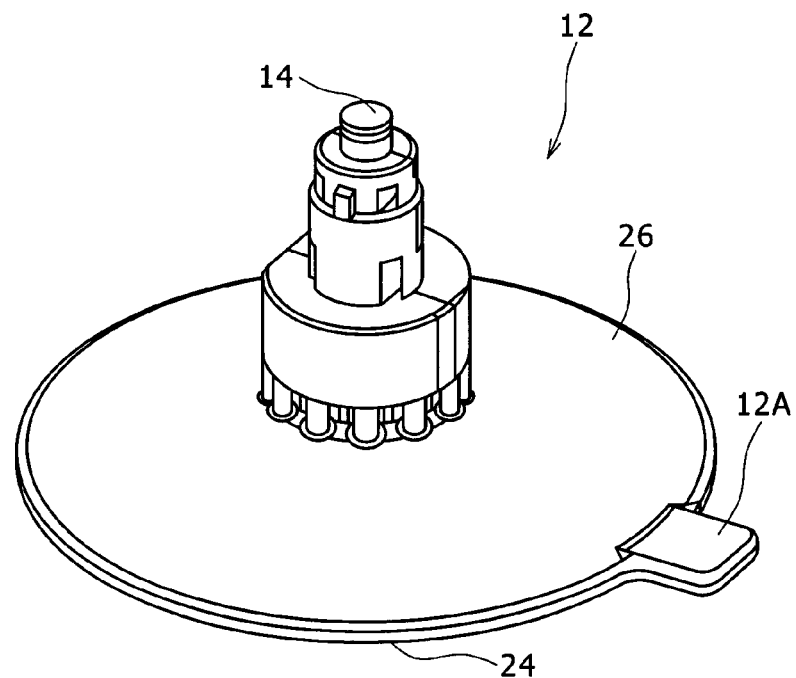
FIG. 6 is a perspective view of a suction cup of the suction cup device.

Referring to FIGS. 1 and 6, the suction cup 12 is generally in the form of a disk having two faces in the thicknesswise direction one of which is formed as a concave suction face 24 and the other of which is formed as a convex rear face 26.

The suction cup 12 can be made of various hitherto known resilient materials hitherto used for suction cups such as, for example, urethane type materials, styrene type materials and silicon resin materials.

It is to be noted that a piece portion 12A for removing operation is provided on an outer edge of the suction cup 12 such that it extends in a diametrically outward direction.

Further, the suction cup 12 can be formed in various hitherto known configurations.

Figure 7:
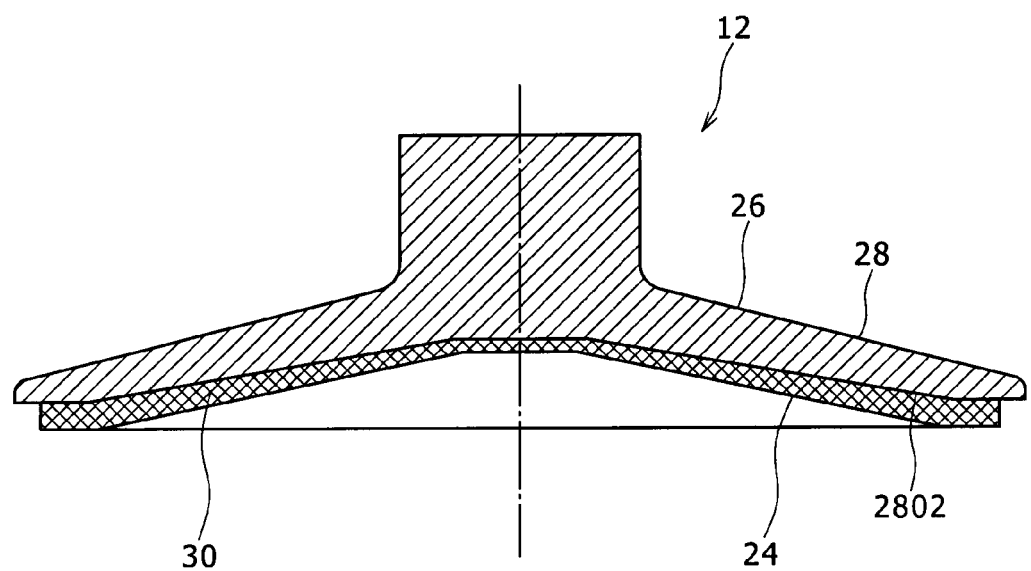
FIG. 7 is a cross sectional view of the suction cup.

Referring now to FIGS. 1 and 7, for example, the suction cup 12 may include a suction cup body 28 in the form of a disk which forms the rear face 26 and a gel layer 30 which forms the suction face 24.

The suction cup body 28 can be made of synthetic resin materials having resiliency, for example, various hitherto known resilient materials hitherto used for suction cups such as urethane type materials, styrene type materials and silicon resin materials similarly to the suction cup 12.

The gel layer 30 is made of gel and bonded to a concave attaching face 2802, which is formed on a face of the suction cup body 28 positioned remotely from the rear face 26, in such a manner as to cover the attaching face 2802. The suction face 24 is formed from the surface of the gel layer 30.

For such gel, gel of a synthetic resin type such as a polyethylene type, a styrene type and the silicon resin type can be used. Further, as the gel of the polyethylene type, for example, "COSMO SUPER GEL" by Cosmo Instruments Co., Ltd. which is an article on the market can be used. As the gel of the styrene type, for example, "NAGFLEX" by Inoac Corporation which is an article on the market can be used. As the gel of the silicon type, for example, "αGEL" (alpha gel) by GELTEC Co., Ltd. which is an article on the market can be used.

Further, for the bonding of the gel layer 30 to the attaching face 2802, such a method of bonding by two-color molding or by means of a bonding agent can be adopted.

Where the suction face 24 is formed from the gel layer 30, even if the attaching object face 2 is formed as a leather embossed face which has fine convexes and concaves or provides a coarse feel, the suction face 24 is deformed following up the convex and concave geometry. Consequently, the suction face 24 can contact closely with the convex and concave face or coarse face without allowing a gap formed therebetween, thereby attaching the suction cup 12 steadily on those kinds of faces. This is advantageous in that various articles are attached with certainty to an attaching object face 2 such as a leather embossed face of the dashboard panel or the like.

Referring to FIG. 1, the center shaft 14 extends in a direction away from the rear face 26 along the thicknesswise direction of the suction cup 12, that is, along the center shaft of the suction face 24, from a central portion of the rear face 26 of the suction cup 12.

The center shaft 14 is formed from a material having rigidity such as, for example, a metal or a hard synthetic resin and is embedded at a lower end thereof in a swollen portion at the center of the suction cup 12.

The attaching base 16 supports such a display panel, a controller or the like as described above on the suction cup 12.

The attaching base 16 is formed from a material having rigidity such as a hard synthetic resin material.

Figure 8:
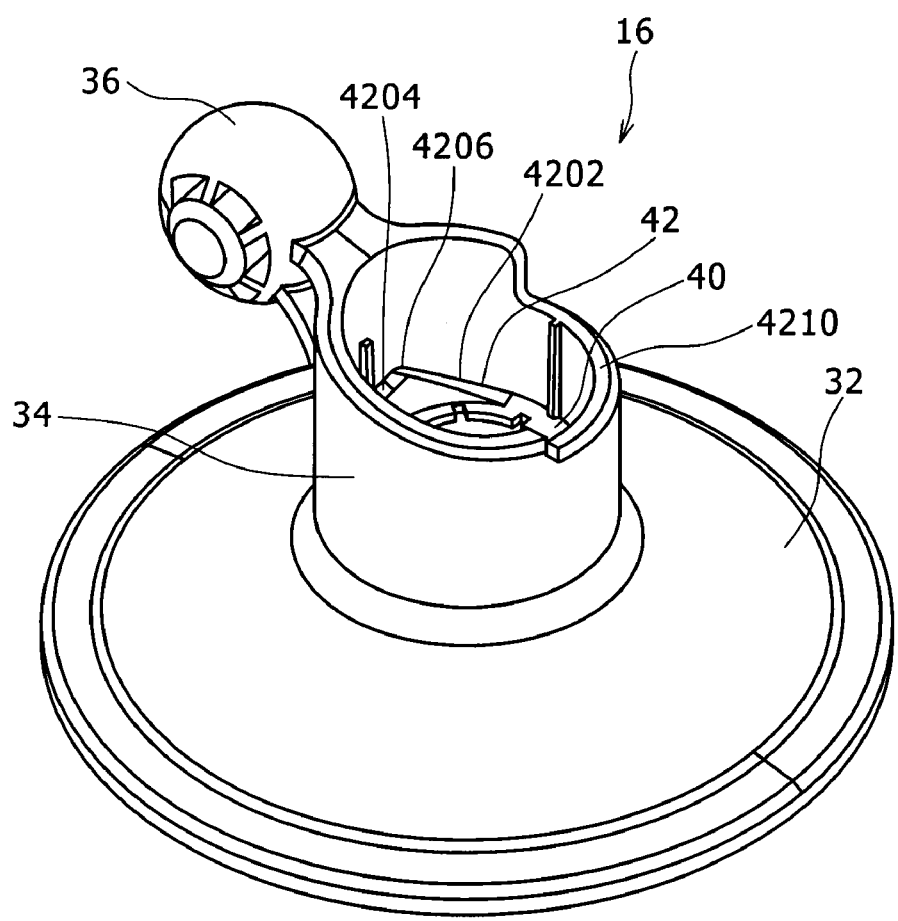
FIG. 8 is a perspective view of an attaching base of the suction cup device.
Figure 9A:
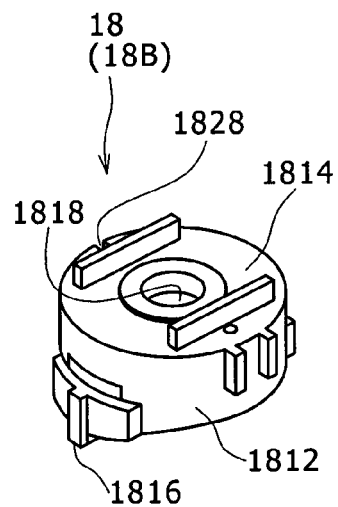
FIGS. 9A and 9B are perspective views of a second member of a rock lever of the suction cup device and FIGS. 9C and 9D are perspective views of a first member of the rock lever.
Figure 9C:
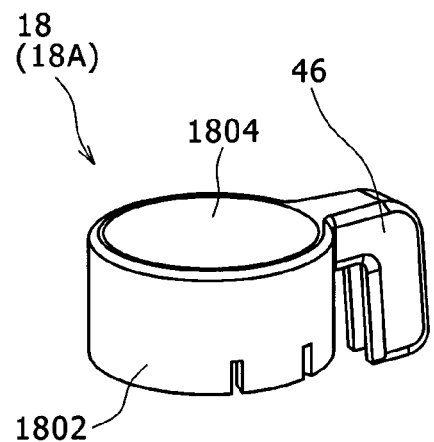
Figure 9B:
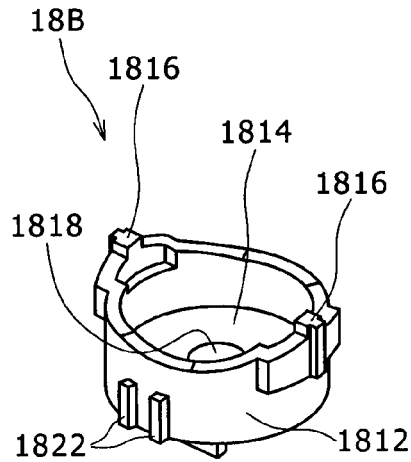
Figure 9D:
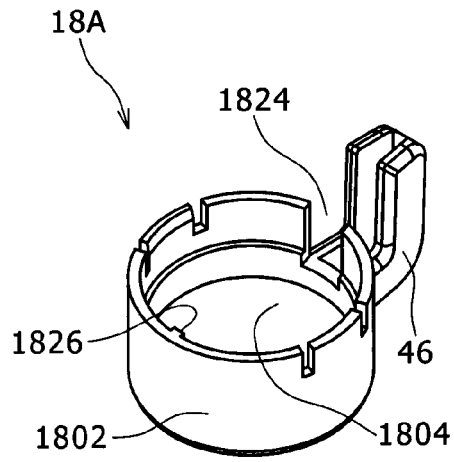

The attaching base 16 has a skirt portion 32, an outer tubular portion 34, an attaching portion 36 and so forth as seen in FIG. 8.

The skirt portion 32 has a spherical surface shape and covers the rear face 26 of the suction cup 12.

Referring to FIG. 1, a resilient member 38 is provided along an overall circumference of an end of the skirt portion 32.

The resilient member 38 is formed from a resilient material having a hardness lower than that of the resilient material of the suction cup 12 such that it can be deformed readily in accordance with the shape of the attaching object face 2. In particular, even if the attaching object face 2 has a non-planar shape such as a spherical shape or a cylindrical shape, the resilient member 38 is deformed following up the shape of the attaching object face 2. Consequently, the suction cup 12 is advantageously allowed to be attached with certainty to the attaching object face 2 of such non-planar shape.

More particularly, the suction cup 12 is formed from a resilient material having a JIS-A hardness of 70 or more while the resilient member 38 is formed from a resilient material of another JIS-A hardness of 40 or more but less than 70.

As such resilient materials, typically a polyurethane foam material can be used, and for example, "PORON" by Inoac Corporation which is an article on the market can be used.

The resilient member 38 has a thickness in a direction parallel to the thicknesswise direction of the suction cup 12 and has an annular belt-like plate shape centered at the center of the suction cup 12, that is, centered at the center of the skirt portion 32.

The resilient member 38 is a portion of the skirt portion 32 which is contacted by the rear face 26 of the attaching object face 2 in an initially attached state, an intermediately attached state and a finally attached state hereinafter described. It is to be noted that the resilient member 38 may be omitted such that the end of the skirt portion 32 is contacted directly with the outer circumference of the rear face 26 of the suction cup 12 or the end of the skirt portion 32 is contacted with a portion of the attaching object face 2 which is positioned on the outer side of the suction cup 12 as indicated by reference character 2A in FIG. 2.

The outer tubular portion 34 is erected uprightly from the center of the skirt portion 32 and has the center shaft 14 accommodated on the inner side thereof.

Referring to FIGS. 1 and 8, an intermediate wall 40 is provided on the inner circumference of an intermediate portion in an axial direction of the outer tubular portion 34 such that it projects in a radially inward direction.

Meanwhile, two cams 42 are provided at portions of the inner circumference of the outer tubular portion 34 positioned on the intermediate wall 40 and spaced by 180 degrees from each other such that they extend along a circumferential direction of the inner circumference of the outer tubular portion 34.

Figure 11:
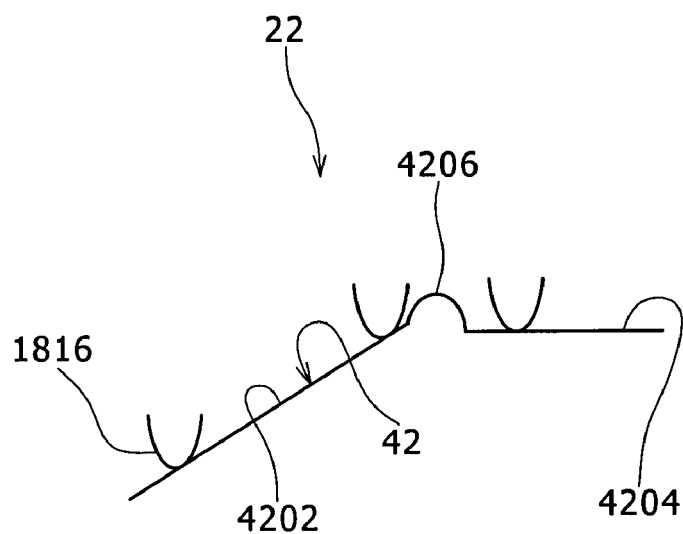
FIG. 11 is a schematic view illustrating operation of a cam mechanism of the suction cup device.

Referring to FIGS. 8 and 11, each of the cams 42 includes an inclined cam 4202, an upper cam 4204 and a locking projection 4206. The inclined cam 4202 extends along a circumferential direction on the inner circumference of the outer tubular portion 34 while being displaced in a direction toward an end of the center shaft 14. The upper cam 4204 connects to an upper end of the inclined cam 4202 displaced most in the direction toward the end of the center shaft 14 and extends along the circumferential direction on the inner circumference of the outer tubular portion 34 at a height substantially equal to the upper end of the inclined cam 4202. The locking projection 4206 is provided at a portion of the upper cam 4204 rather near to the inclined cam 4202.

Referring to FIG. 8, a cutaway portion 4210 is formed at an end portion in an axial direction of the outer tubular portion 34 remote from the suction cup 12 such that it extends along the circumferential direction of the outer tubular portion 34. The cutaway portion 4210 is provided to allow the rock lever 18 to rotate between an initial position and a rocked position. More particularly, a lever portion 46 hereinafter described is arrested by one end of the cutaway portion 4210 in the extension direction to define the initial position, and is arrested by the other end of the cutaway portion 4210 in the extension direction to define the rocked position.

The attaching portion 36 is provided at an end portion in the axial direction of the outer tubular portion 34 remote from the suction cup 12 as seen in FIG. 1.

The attaching portion 36 is a portion to which an article to be supported on the attaching object face 2 is attached by the suction cup device 10. In the present embodiment, the article is, for example, a controller for remotely controlling a display panel, various vehicle-carried apparatus or a like apparatus.

Figure 5A:
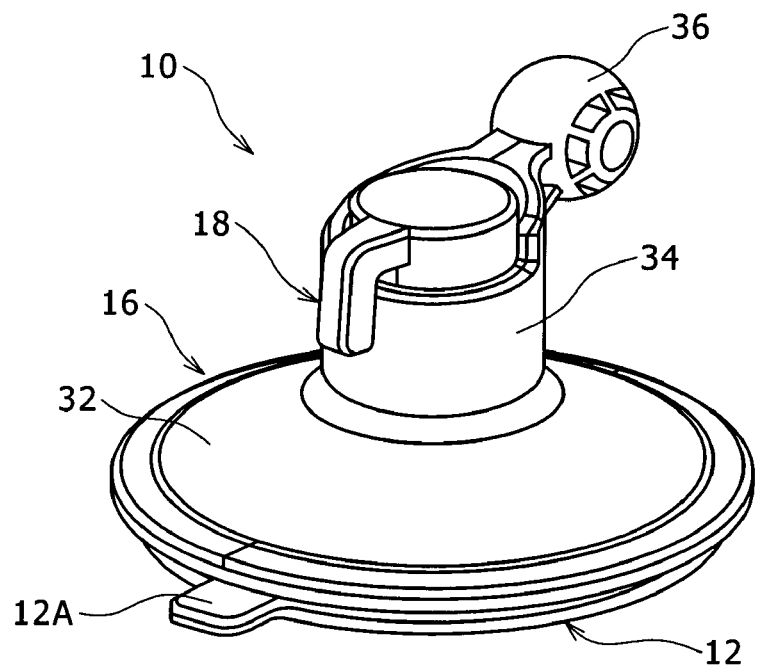
FIGS. 5A and 5B are perspective views showing the suction cup device in the intermediately attached state and the finally attached state, respectively.
Figure 5B:
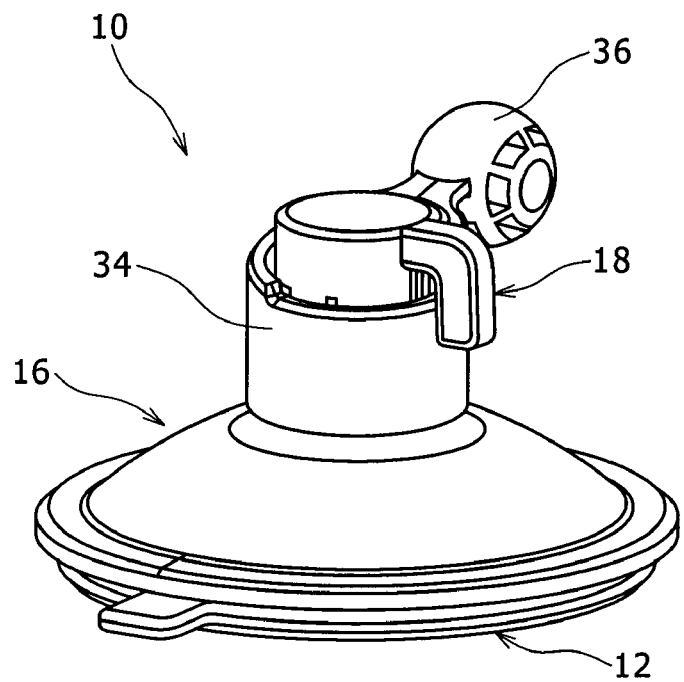

The rock lever 18 is coupled to an end portion of the center shaft 14 against movement in an axial direction of the center shaft 14 but for rotation between such an initial position as seen in FIG. 5A and such a rocked position as seen in FIG. 5B in a circumferential direction of the center shaft 14.

The rock lever 18 is formed from a material having rigidity such as a hard synthetic resin material.

The rock lever 18 has an inner tubular portion 44 inserted between the outer circumference of the center shaft 14 and the inner circumference of the outer tubular portion 34 and coupled to the center shaft 14 against movement in the axial direction of the center shaft 14 but for rotation around the center shaft 14. The rock lever 18 further has a lever portion 46 for rotating operation extending outwardly in a radial direction of the inner tubular portion 44 from the inner tubular portion 44.

In the present embodiment, the rock lever 18 is formed from two members including a first member 18A and a second member 18*b* as seen in FIGS. 9A to 9D.

The first member 18A has a tubular portion 1802 and a first end wall 1804 which closes up one end in an axial direction of the tubular portion 1802. The lever portion 46 is provided in a projecting manner on the tubular portion 1802.

The second member 18B has a tubular portion 1812, and a second end wall 1814 which closes up one end in an axial direction of the tubular portion 1812. A pair of projections 1816 are provided at different portions, spaced by a distance of 180 degrees from each other, at the other end portion in the axial direction of the tubular portion 1812 positioned rather near to the suction cup 12. A hole 1818 is formed at the center of the second end wall 1814.

In the present embodiment, the cam mechanism 22 is formed from the cams 42 of the outer tubular portion 34 and the projections 1816 of the second member 18B as seen in FIG. 11.

Assembly of the first member 18A and the second member 18*b* is performed in the following manner.

First, the tubular portion 1812 of the second member 18*b* is inserted between the outer circumference of the center shaft 14 and the inner circumference of the outer tubular portion 34 as seen in FIGS. 1 and 9A to 9D. Then, an end portion of the center shaft 14 is inserted into the hole 1818, and a stop ring 1820 is attached to a portion of the center shaft 14 which projects from the hole 1818 thereby to attach the second member 18*b* to the end portion of the center shaft 14 against movement in the axial direction but for rotation in a circumferential direction of the center shaft 14.

Then, the first member 18A is fitted to the outer side with and fixed to the second member 18B.

This fitting fixation is performed such that projections 1822 (refer to FIG. 9B) of the tubular portion 1812 of the second member 18B are fitted into cutaway portion 1824 (refer to FIG. 9D) of the tubular portion 1802 of the first member 18A and a projection 1826 (refer to FIG. 9D) on the inner circumference of the tubular portion 1802 of the first member 18A is fitted into a recess 1828 (refer to FIG. 9A) on the outer circumference of the tubular portion 1812 of the second member 18B.

Accordingly, in the present embodiment, the inner tubular portion 44 (refer to FIG. 1) is formed from the tubular portion 1802 of the first member 18A and the tubular portion 1812 of the second member 18B.

Then, the first and second members 18A and 18B are attached to the center shaft 14 such that the lever portion 46 is positioned above the cutaway portion 4210 (refer to FIG. 8). More particularly, the first and second members 18A and 18B are attached to the center shaft 14 such that the projections 1816 are positioned between the two cams 42 while the lever portion 46 is positioned at the initial position at one end portion of the cutaway portion 4210 in the extension direction.

The first end wall 1804 and the second end wall 1814 are positioned closely to each other in a state wherein the first and second members 18A and 18B are fitted on the center shaft 14, and the first end wall 1804 is provided at an end portion in the axial direction of the inner tubular portion 44 positioned rather near to the end portion of the center shaft 14 such that it closes up the end portion of the inner tubular portion 44. Further, the second end wall 1814 is provided at a portion in the inside of the inner tubular portion 44 rather near to the first end wall 1804 such that it projects inwardly in a radial direction of the inner tubular portion 44.

Figure 10:
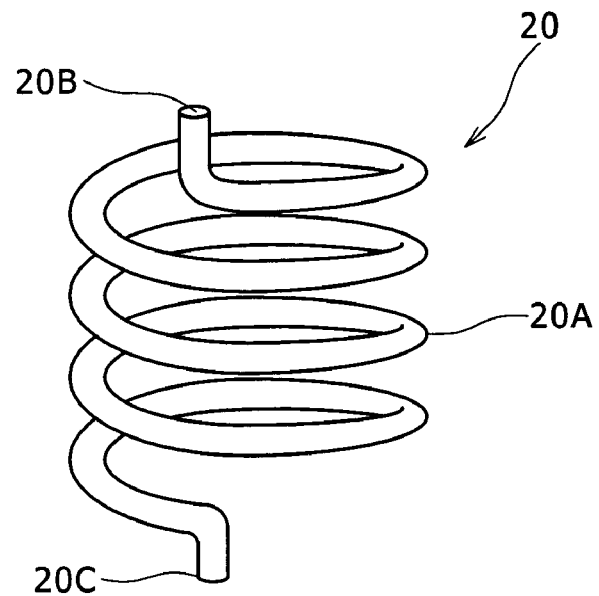
FIG. 10 is a perspective view of a coil spring of the suction cup device.

Referring to FIG. 10, the coil spring 20 has a coiled portion 20A, and a pair of end portions 20B and 20C bent at the opposite ends of the coiled portion 20A.

Referring to FIG. 1, the coiled portion 20A of the coil spring 20 is disposed around the center shaft 14 on the inner side of the outer tubular portion 34, and the end portion 20B is anchored by the outer tubular portion 34 while the end portion 20C is anchored by the rock lever 18 to bias the rock lever 18 toward the initial position and bias the outer tubular portion 34 and the rock lever 18 to move away from each other along the center shaft 14.

Figure 2:
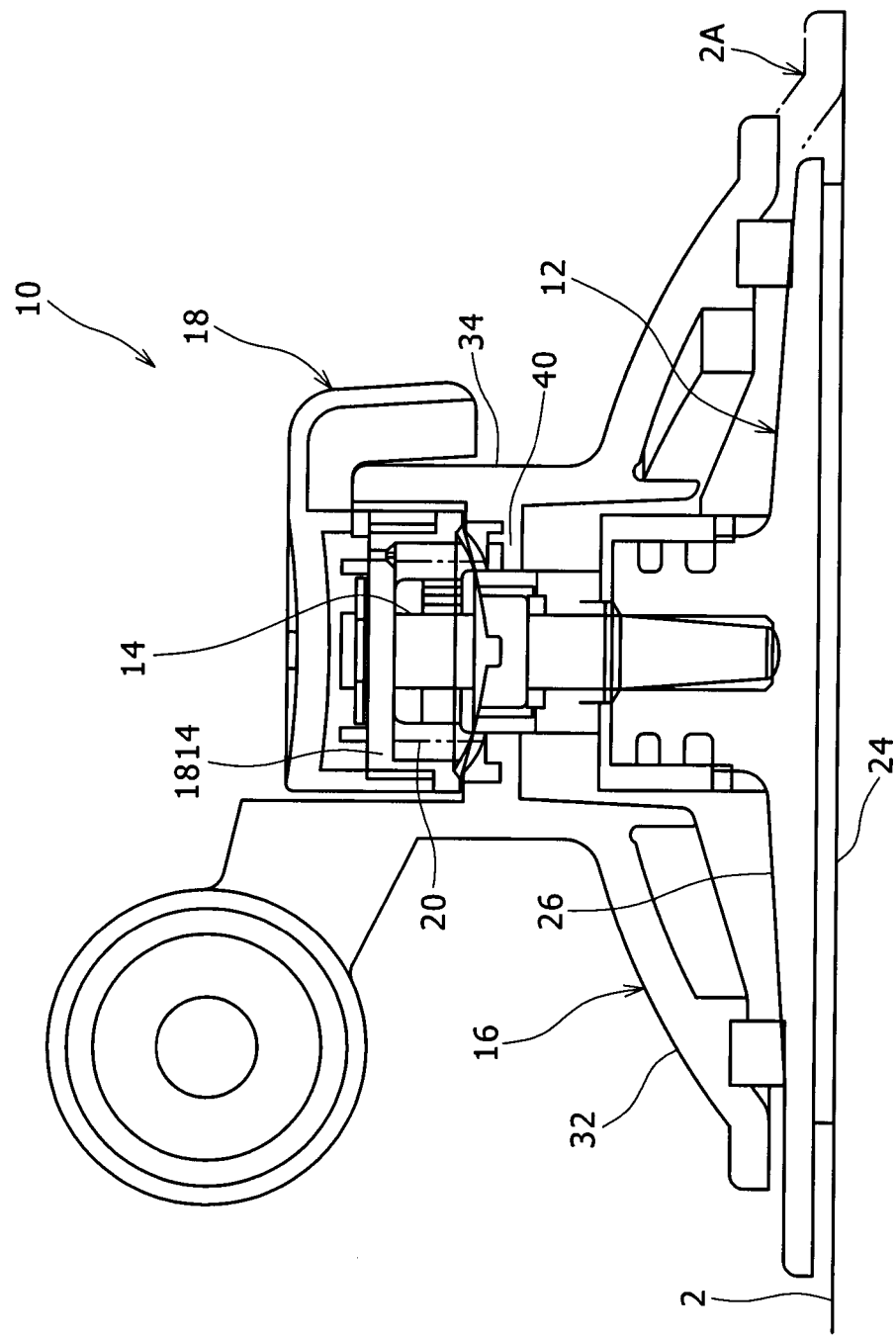
FIG. 2 is a sectional view of the suction cup device in an initially attached state.

More particularly, the coil spring 20 is disposed between the second end wall 1814 and the intermediate wall 40 around the center shaft 14 as seen in FIG. 2. The coil spring 20 is anchored at the end portion 20B thereof by the intermediate wall 40 and at the end portion 20C thereof by the second end wall 1814 and biases the rock lever 18 toward the initial position while it biases the outer tubular portion 34 and the center shaft 14 to move away from each other.

In the present embodiment, the coil spring 20 is provided to exert resilient force for obtaining an intermediately attached position hereinafter described.

Now, operation of the suction cup device 10 is described.

If the suction face 24 of the suction cup 12 is opposed to the attaching object face 2 and the center shaft 14 is pressed against the attaching object face 2 until the suction face 24 is contacted over an overall area thereof with the attaching object face 2 and the end of the skirt portion 32 is contacted with an outer circumferential portion of the rear face 26 or with a portion (refer to 2A in FIG. 2) of the attaching object face 2 on the outer side in a radial direction of the rear face 26. The initially attached state illustrated in FIGS. 2 and 5A is established thereby. It is to be noted that the operation of pressing the center shaft 14 against the attaching object face 2 is performed by a user pressing the first end wall 1804 of the rock lever 18 with its finger.

If the rock lever 18 is rotated from the initial position to the rocked position while the suction cup device 10 is in the initially attached state described above, then the center shaft 14 is displaced compulsorily in a direction away from the attaching object face 2 by the cam mechanism 22 thereby to establish the finally attached state illustrated in FIGS. 4 and 5B.

More specifically, if the rock lever 18 is rotated from the initial position to the rocked position, then the projections 1816 slidably move on the inclined cams 4202 as seen in FIG. 11. Consequently, the center shaft 14 is displaced compulsorily in a direction away from the attaching object face 2. The projections 1816 soon ride over the locking projections 4206 and come to the upper cams 4204. While the rock lever 18 tends to return to the initial position by the biasing force of the coil spring 20, since the projections 1816 engage with the locking projections 4206, the rock lever 18 remains at the rocked position.

Figure 3:
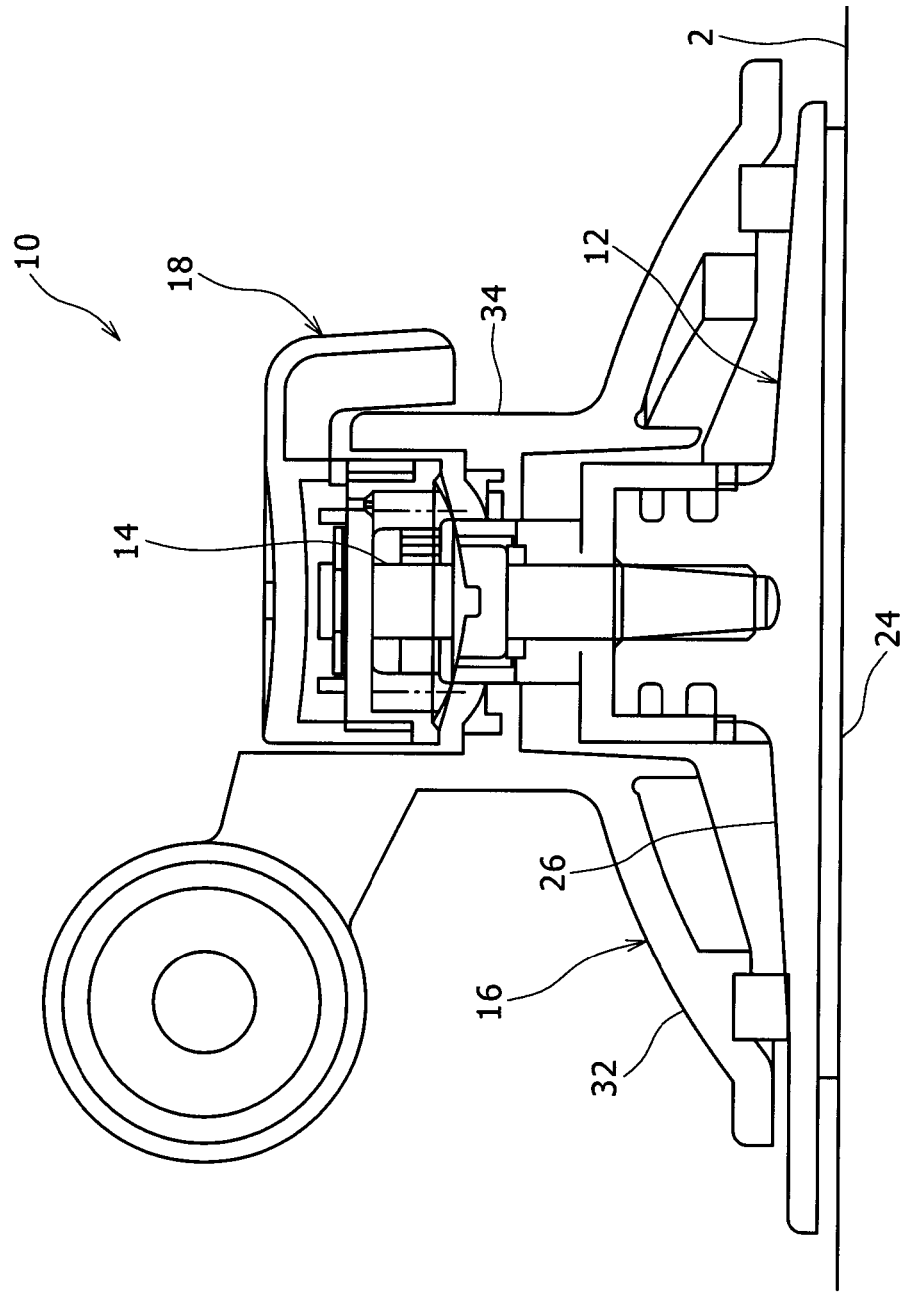
FIG. 3 is a sectional view of the suction cup device in an intermediately attached state.

In the present embodiment, if the first end wall 1804 of the rock lever 18 is released from the finger while the suction cup device 10 is in the initially attached state, then the rock lever 18 is moved to the intermediately attached position illustrated in FIG. 3 by the coil spring 20.

The intermediately attached position is established by the center shaft 14 being displaced in a direction away from the attaching object face 2 by the resilient force of the coil spring 20 in the initially attached state.

Accordingly, in the present embodiment, the finally attached state is established when, while the suction cup device 10 is in the intermediately attached state, the rock lever 18 is rotated from the initial position to the rocked position to further displace the center shaft 14 in the direction away from the attaching object face 2.

The suction cup device 10 is attached firmly to the attaching object face 2 in such a finally attached state as just described, and such an article as a controller for remotely controlling a display panel or various vehicle-carried articles is supported on the dashboard in the cabin of an automobile.

On the other hand, removal of the suction cup device 10 from the attaching object face 2 is performed by exfoliating the piece portion 12A from the attaching object face 2 to exfoliate the suction cup 12.

If the suction cup 12 is removed from the attaching object face 2, then the outer tubular portion 34 and the rock lever 18 are spaced away from each other along the center shaft 14 by the coil spring 20, and consequently, the projections 1816 are displaced from the cams 42. Then, the rock lever 18 is rotated from the rocked position toward the initial position by the biasing force of the coil spring 20 until it is returned to the initial position.

Accordingly, with the suction cup device 10 of the present embodiment, the finally attached state can be established by an operation of the rock lever 18, which is advantageous when it is tried to firmly attach the suction cup device 10 to the attaching object face 2.

Further, since the operation of the rock lever 18 is performed by rotating the rock lever 18 around the center shaft 14, the rock lever 18 can be operated to rotate without assuring a great space. Accordingly, the suction cup device 10 can be attached advantageously.

Further, if the suction cup device 10 is removed from the attaching object face 2, then the rock lever 18 automatically returns to the initial position. Consequently, the operability of the suction cup device 10 can be enhanced advantageously.

Further, although the intermediately attached state may be omitted, where the intermediately attached state is implemented using the coil spring 20 as in the embodiment described above, then the suction cup device 10 can be attached firmly to the attaching object face 2 advantageously by the finally attached state.

Further, with the suction cup device 10 of the present embodiment, the action of biasing the rock lever 18 from the rocked position to the initial position and the action of biasing the outer tubular portion 34 and the rock lever 18 in a direction away from each other along the center shaft 14 are implemented by the single coil spring 20. Therefore, reduction of the number of parts and simplification of the structure can be anticipated advantageously.

It is to be noted that, while, in the embodiment described above, the suction cup device 10 is used to attach a controller for a display panel or various vehicle-carried apparatus, the article to be supported by the suction cup device 10 is not limited to such vehicle-carried articles, but the present invention can be applied to various other apparatus.

While a preferred embodiment of the present invention has been described using specific terms, such description is for illustrative purpose only, and it is to be understood that changes and variations may be made without departing from the spirit or scope of the following claims.

What is claimed is:

1. A suction cup device, comprising:

a suction cup having a suction face and a rear face along a thicknesswise direction thereof;

a center shaft provided at the center of said rear face of said suction cup and extending in a direction away from said rear face along the thicknesswise direction;

an attaching base having a skirt portion configured to cover said rear face of said suction cup and an outer tubular portion projecting from the center of said skirt portion and having said center shaft accommodated therein;

a rock lever coupled to an end portion of said center shaft against movement in an axial direction of said center shaft but for rotation in a circumferential direction of said center shaft between an initial position and a rocked position;

a coil spring disposed around said center shaft on the inner side of said outer tubular portion and anchored at one end thereof by said outer tubular portion and at the other end thereof by said rock lever in such a manner as to bias said rock lever toward the initial position and bias said outer tubular portion and said rock lever in a direction away from each other along said center shaft; and a cam mechanism provided between said outer tubular portion and said rock lever and configured to move, in response to the rotation of said rock lever from the initial position to the rocked position, said suction cup from an initially attached state which is established by pressing, with said suction face opposed to an attaching object face, said center shaft against the attaching object face until said suction face is contacted over an overall area thereof with the attaching object face and an end portion of said skirt portion is contacted with an outer circumferential portion of said rear face or with a portion of the attaching object face on the outer side in a radial direction of said rear face to a finally attached state wherein said center shaft is displaced in a direction away from the attaching object face and then retain said rock lever at the rocked position against the biasing force of said coil spring.

2. The suction cup device according to claim 1, wherein:

said suction cup further has an intermediately attached state wherein said center shaft is displaced in the direction away from the attaching object face by said coil spring from the position thereof when said suction cup is in the initially attached state; and the finally attached state is established by rotating, while said suction cup is in the intermediately attached state, said rock lever from the initial position to the rocked position to further displace said center shaft in the direction away from the attaching object face.

3. The suction cup device according to claim 1, wherein:

said rock lever has an inner tubular portion inserted between the outer circumference of said center shaft and the inner circumference of said outer tubular portion and coupled to said center shaft against movement in the axial direction of said center shaft but for rotation around said center shaft, and a lever portion for rotating operation projecting outwardly in a radial direction of said inner tubular portion from said inner tubular portion; and said cam mechanism is provided between the inner circumference of said outer tubular portion and said inner tubular portion.

4. The suction cup device according to claim 1, wherein:

said rock lever has an inner tubular portion inserted between the outer circumference of said center shaft and the inner circumference of said outer tubular portion and coupled to said center shaft against movement in the axial direction of said center shaft but for rotation around said center shaft, and a lever portion projecting outwardly in a radial direction of said inner tubular portion from said inner tubular portion; and said cam mechanism includes a cam provided on the inner circumference of an intermediate portion in the axis direction of said outer tubular portion and extending in a circumferential direction of the inner circumference, and a projection provided at an end portion in the axial direction of said inner tubular portion positioned rather near to said suction cup and configured to engage with said cam.

5. The suction cup device according to claim 1, wherein:

said rock lever has an inner tubular portion inserted between the outer circumference of said center shaft and the inner circumference of said outer tubular portion and coupled to said center shaft against movement in the axial direction of said center shaft but for rotation around said center shaft, and a lever portion projecting outwardly in a radial direction of said inner tubular portion from said inner tubular portion;

an intermediate wall is provided on the inner circumference of an intermediate portion in the axial direction of said outer tubular portion in such a manner as to be positioned in the proximity of or contacted with an end portion in the axial direction of said inner tubular portion positioned rather near to said suction cup; and said cam mechanism includes a cam provided on said intermediate wall and extending in a circumferential direction of said intermediate wall, and a projection provided at an end portion in the axial direction of said inner tubular portion positioned rather near to said suction cup and configured to engage with said cam.

6. The suction cup device according to claim 1, wherein:

said rock lever has an inner tubular portion inserted between the outer circumference of said center shaft and the inner circumference of said outer tubular portion and coupled to said center shaft against movement in the axial direction of said center shaft but for rotation around said center shaft, and a lever portion projecting outwardly in a radial direction of said inner tubular portion from said inner tubular portion;

a first end wall being provided at an end portion in the axial direction of said inner tubular position positioned rather near to the end portion of said center shaft in such a manner as to close up the end portion of said inner tubular portion, a second end wall being provided at a portion in the inside of said inner tubular portion rather near to said first end face in such a manner as to project inwardly in a radial direction of said inner tubular portion, said first end wall serving as a pressing portion for pressing said center shaft against the attaching object face when the initially attached state is to be established, said second end wall being coupled to an end portion of said center shaft against movement in the axial direction of said center shaft but for rotation around said center shaft, an intermediate wall being provided on the inner circumference of an intermediate portion in the axial direction of said outer tubular portion in such a manner as to project inwardly in a radial direction, and said coil spring being disposed between said second end wall and said intermediate wall around said center shaft.

7. The suction cup device according to claim 1, wherein:
said rock lever has an inner tubular portion inserted between the outer circumference of said center shaft and the inner circumference of said outer tubular portion and coupled to said center shaft against movement in the axial direction of said center shaft but for rotation around said center shaft, and a lever portion projecting outwardly in a radial direction of said inner tubular portion from said inner tubular portion;
a first end wall being provided at an end portion in the axial direction of said inner tubular position positioned rather near to the end portion of said center shaft in such a manner as to close up the end portion of said inner tubular portion,
a second end wall being provided at a portion in the inside of said inner tubular portion rather near to said first end face in such a manner as to project inwardly in a radial direction of said inner tubular portion,
said first end wall serving as a pressing portion for pressing said center shaft against the attaching object face when the initially attached state is to be established,
said second end wall being coupled to an end portion of said center shaft against movement in the axial direction of said center shaft but for rotation around said center shaft,
an intermediate wall being provided on the inner circumference of an intermediate portion in the axial direction of said outer tubular portion in such a manner as to project inwardly in a radial direction,
said coil spring being disposed between said second end wall and said intermediate wall around said center shaft,
said coil spring being anchored at one end thereof by said intermediate wall and at the other end thereof by said end wall.

8. The suction cup device according to claim 1, wherein:
said rock lever has an inner tubular portion inserted between the outer circumference of said center shaft and the inner circumference of said outer tubular portion and coupled to said center shaft against movement in the axial direction of said center shaft but for rotation around said center shaft, and a lever portion projecting outwardly in a radial direction of said inner tubular portion from said inner tubular portion;
said cam mechanism includes a cam provided on the inner circumference of an intermediate portion in the axis direction of said outer tubular portion and extending in a circumferential direction of the inner circumference, and a projection provided at an end portion in the axial direction of said inner tubular portion positioned rather near to said suction cup and configured to engage with said cam; and
said cam includes an inclined cam extending along a circumferential direction of the inner circumference of said outer tubular portion while being displaced in a direction toward an end portion of said center shaft, an upper cam connecting to an end portion of said inclined cam displaced most in the direction toward the end portion of said center shaft and extending along a circumferential direction of the circumference of said outer tubular portion, and an anchoring projection provided at a portion of said upper cam rather near to said inclined cam.

9. The suction cup device according to claim 1, wherein:
said rock lever has an inner tubular portion inserted between the outer circumference of said center shaft and the inner circumference of said outer tubular portion and coupled to said center shaft against movement in the axial direction of said center shaft but for rotation around said center shaft, and a lever portion for rotating operation projecting outwardly in a radial direction of said inner tubular portion from said inner tubular portion;
a cutaway portion being formed on said outer tubular portion so as to extend in the circumferential direction such that said lever is inserted into said cutaway portion,
said lever portion being locked by one end of said cutaway portion in the extension direction to define the initial position whereas said lever portion is locked by the other end of said cutaway portion in the extension direction to define the rocked position.

10. The suction cup device according to claim 1, wherein:
said suction cup includes a suction cup body and a gel layer;
said suction cup body being formed from a resilient material while forming said rear face,
said gel layer being formed from gel and attached to said suction cup body to form said suction face.

11. A suction cup device, comprising:
a suction cup having a suction face and a rear face along a thicknesswise direction thereof;
a center shaft provided at the center of said rear face of said suction cup and extending in a direction away from said rear face along the thicknesswise direction;
an attaching base having a skirt portion configured to cover said rear face of said suction cup and an outer tubular portion projecting from the center of said skirt portion and having said center shaft accommodated therein;
a rock lever coupled to an upper portion of said center shaft against movement in an axial direction of said center shaft but for rotation in a circumferential direction of said center shaft between an initial position and a rocked position; and
a coil spring disposed around said center shaft on the inner side of said outer tubular portion and anchored at one end thereof by said outer tubular portion and at the other end thereof by said rock lever in such a manner as to bias said rock lever toward the initial position and bias said outer tubular portion and said rock lever in a direction away from each other along said center shaft; wherein
said suction cup has an intermediately attached state in which said center shaft is displaced in a direction away from an attaching object face from a position thereof in an initially attached state of said suction cup device in which said suction face contacts over an overall area thereof with the attaching object face with said suction face opposed to the attaching object face and with said center shaft pressed against the attaching object face and a lower end of said skirt portion is contacted with an outer circumferential portion of said rear face or with a portion of the attaching object face on the outer side of said rear face in a radial direction being formed by said coil spring,
said suction cup device has a cam mechanism configured to move, in response to rotation of said rock lever from the initial position to the rocked position, said suction cup from the position in the intermediately attached state to another position in a finally attached state in which said center shaft is displaced further in the direction away from the attaching object face and then retain said rock lever at the rocked position against the biasing force of said coil spring.

* * * * *